United States Patent

James et al.

[15] 3,680,568
[45] Aug. 1, 1972

[54] APPARATUS FOR DEFLASHING ANNULAR PALSTIC ARTICLES

[72] Inventors: Edgar T. James; Dominic Magri, both of Windsor, Ontario, Canada

[73] Assignee: Swedish Crucible Steel Company, Detroit, Mich.

[22] Filed: Oct. 8, 1969

[21] Appl. No.: 864,618

[52] U.S. Cl. ............................134/63, 425/806, 134/78, 425/445
[51] Int. Cl. ............................................B29c 23/00
[58] Field of Search.......18/DIG. 18, 24, 41, 4 P, 4 R

[56] References Cited

UNITED STATES PATENTS

| | | | |
|---|---|---|---|
| 2,482,418 | 9/1949 | Jenkins | 18/24 X |
| 1,977,704 | 10/1934 | Vaughan et al. | 18/24 UX |
| 2,755,507 | 7/1956 | Heller | 18/24 |
| 2,862,236 | 12/1958 | Shapero | 18/24 |

Primary Examiner—J. Spencer Overholser
Assistant Examiner—Norman E. Lehrer
Attorney—Barthel & Bugbee

[57] ABSTRACT

Plastic workpieces, such as automobile steering wheels, are mounted on rotatable shafts on workpiece carriers spaced at intervals along an endless conveyor chain arranged a drive track, the shafts being inclined downward and outward therefrom and the lower course of the conveyor chain extending adjacent a tank containing a plastic solvent solution. As the workpieces are carried into the tank, they are lowered into the solution by the combination of shaft angle and track angle, whereupon pulleys on the shafts engage the drive track and are rotated thereby together with the workpieces carried thereby as they move through and along the tank while the workpieces are partly immersed in the solution, so as to agitate it as they rotate and pass through it. From the tank, the workpiece carriers and workpieces are carried upward through an oven which rapidly evaporates the excess solvent that has not already been drawn off by the combined actions of surface tension and gravity. The plastic workpieces emerge dry, polished and free of flash from the oven and pass around a conveyor chain drive sprocket to an unloading station, immediately beyond which is a loading station for the next plastic workpieces to be processed.

3 Claims, 5 Drawing Figures

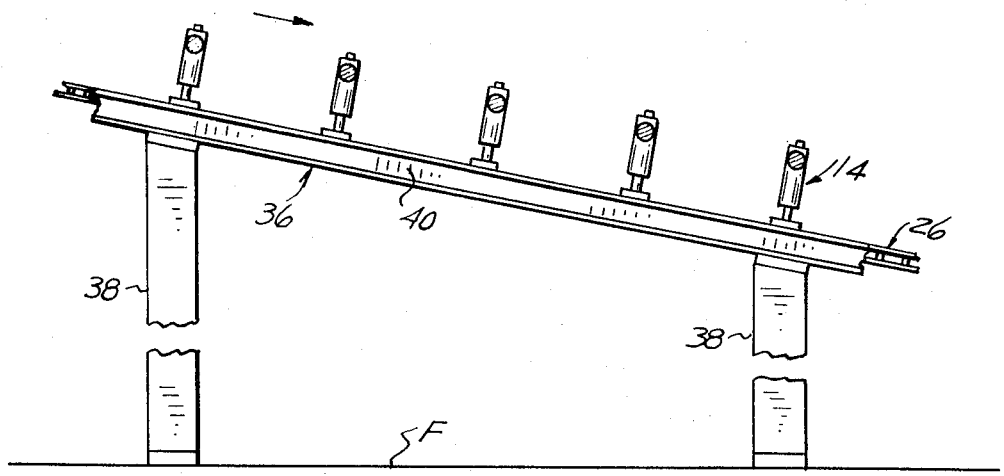
FIG. 2
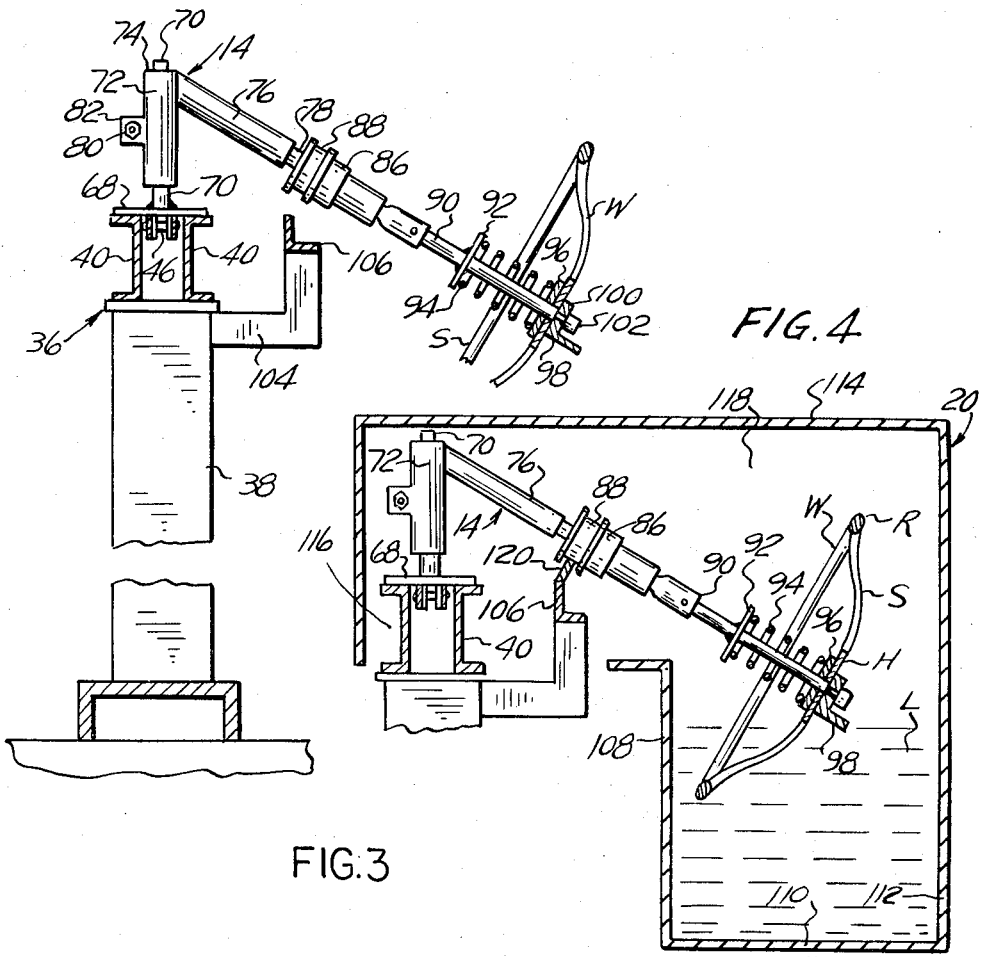
FIG. 4
FIG. 3
INVENTORS
EDGAR THOMAS JAMES
DOMINIC MAGRI
BY Barthel & Bugbee
ATTORNEYS

APPARATUS FOR DEFLASHING ANNULAR PALSTIC ARTICLES

In the drawings,

FIG. 2 is a fragmentary longitudinal section taken along the line 2—2 in FIG. 1;

FIG. 3 is an enlarged cross-section taken along the line 3—3 in FIG. 1, showing one of the work carriers in its non-rotating position;

FIG. 4 is an enlarged cross-section taken along the line 4—4 in FIG. 1, showing the work carrier in its rotating position upon entering the solvent tank; and FIG. 5 is an enlarged cross section taken along the line 5—5 in FIG. 1, showing the work carrier in its rotating position about to leave the solvent tank.

Figure 1:
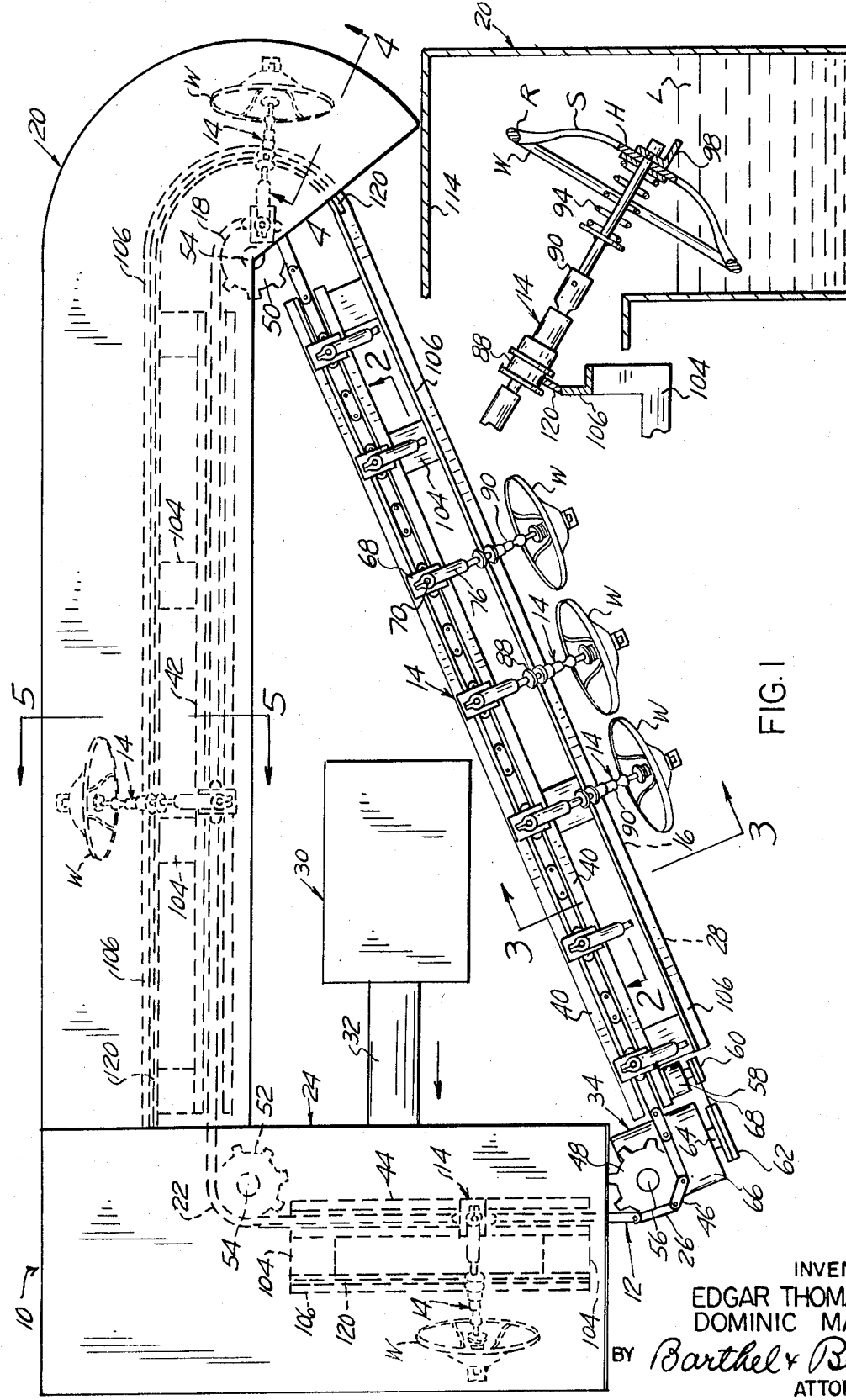
FIG. 1 is a top plan view of an apparatus for solvent polishing and deflashing of plastic workpieces, according to one form of the invention.

Referring to the drawings in detail, FIG. 1 shows a solvent polishing and deflashing apparatus, generally designated 10, for plastic workpieces W, according to one form of the invention, as consisting generally of an endless conveyor 12 arranged in an inclined plane and provided at intervals therealong with rotatable work carriers 14. The latter travel successively from a loading station 16 downward to turn a first corner 18 in an elongated horizontal tank 20 where a combination of spindle angle and track angle lowers the workpieces W into the solvent bath L therein which removes the flash from the workpieces W on the work carriers 14 FIGS. 4 and 5). After this, the work carriers 14 turn a second corner 22 and move upward through an oven 24, emerging therefrom with the solvent completely evaporated. The work carriers 14 then turn a third corner 26 and arrive at the unloading station 28. For purposes of simplification, FIG. 1 shows only three of the work carriers 14 out in the open, and three others within the tank 20 and oven 24. A conventional heater 30 heats the air and drives it upward through a conduit 32 into the oven 24. A motor-driven variable speed-reduction power unit 34 provides the necessary power for effecting travel of the endless conveyor 12.

The endless conveyor 12 is mounted on a supporting structure 36 which includes uprights 38 resting upon and secured to the floor F. The supporting structure 36 also includes three pairs of channel tracks 40, 42 and 44 (FIGS. 1 and 3) located in three courses, namely along the loading and unloading stations 16 and 28, within the tank 20 and within the oven 24. The conveyor 12 includes a conveyor chain 46 meshing with a drive sprocket 48 and two idler sprockets 50 and 52 located respectively at the corners 26, 18 and 22 of the triangular path of the conveyor 12. The idler sprockets 50 and 52 are rotatably mounted on axles 54 which in turn are supported on the conveyor supporting structure 36. The drive sprocket 48 is mounted on and keyed or otherwise drivingly secured to the output shaft 56 of the power unit 34. The latter includes an electric motor 58 driving a pulley or sprocket 60 which in turn drives a sprocket or pulley 62 on the input shaft 64 of a variable speed reduction gear box 66 through a sprocket chain or belt 67 as the case may be. The motor 58 and variable speed gear box 66 are also mounted on the conveyor supporting structure 36.

Each work carrier 14 (FIGS. 1 and 3) consists of a base or slide 68 connected to the endless conveyor chain 46 and slidable along the upper flanges of the pairs of channel tracks 40. Thus, the base 68 is a conveyor flight to which is welded or otherwise secured an upright post 70 to which is adjustably clamped the split hub portion 72 of an inverted V-bracket 74, the downwardly inclined arm 76 of which contains a pintle 78, which is thereby inclined downward and outward away from said conveyor 12 at a substantially constant angle relatively thereto throughout the endless path of travel thereof. The split hub 72 or vertical arm of the bracket 74 is tightened into clamping engagement with the upright post 70 by a clamping bolt 80 passing through spaced ears 82 integral with the vertical arm or hub 72 on opposite sides of the split or slot 84 therein.

Rotatably mounted upon the pintle 78 is the hub 86 of a pulley 88 containing the upper end of a downwardly inclined rotary shaft 90 (FIG. 3). Welded or otherwise secured to the shaft 90 remote from the lower end thereof is a spring abutment disc 92 which serves as the rearward abutment for a quick-releasing workpiece gripper including a helical compression spring 94 encircling the shaft 90. The spring 94 at its forward end engages a washer or collar 96 which engages the steering wheel or other workpiece W and urges the latter against the removable stop 98 having a notch 100 therein engageable with a groove 102 near the lower end of the shaft 90.

Mounted on the uprights 38 and extending forwardly therefrom are angle brackets 104, the upper ends of which support an angle bar 106 which is inclined downwardly parallel to the path of travel of the conveyor chain 46 in a rounded V-shaped path extending adjacent the tank 20 along the rearward or outer side of the inner wall 108 thereof. The tank 20 (FIGS. 4 and 5) is an elongated enclosed tank with a bottom wall 110 connecting the lower inner wall 108 to an outer wall 112 which in turn extends upward to a top wall 114 joining it to an upper inner wall 115. The latter is spaced away from the lower inner wall 108 so as to provide an elongated opening 116 through which the work carrier 14 carrying the workpiece W projects into the interior chamber 118 of the tank 20.

Mounted on the horizontal course of the angle bar 106 adjacent the rearward or inner wall 108 is an inclined drive track 120 (FIGS. 4 and 5) of synthetic rubber or the like adapted to engage the pulley 88 and rotate the latter and its shaft 90, together with the workpiece W, as the arm 76 of the conveyor bracket 74 conveys the work carrier 14 horizontally along and above the drive track 120. As the pulley 88 rolls along the drive track 120, its frictional engagement therewith causes the above-mentioned rotation. It will be understood that a pinion and rack track (not shown) may be used instead of the pulley 88 and drive track 120 respectively.

The outlet end of the tank 20 opens into the inlet or lower end of the oven 24 which is an upwardly inclined elongated box-shaped enclosure, the interior of which is supplied with hot air through the conduit 32 from the heater 30. The latter is of any suitable type, a conventional oil-fired space heater having been found satisfactory for this purpose. The drive track 120 terminates at the outlet end of the tank 20 at its entrance to the oven 24, through which the workpieces W travel while rotating.

In the operation of the invention, let it be assumed that the workpieces W are automobile steering wheels, each having a metallic spider S extending from a central hub H to an annular rim R of cellulose acetate, cellulose acetate butyrate or cellulose acetate proprionate, the latter two being polymers of cellulose acetate. Let it also be assumed that the tank 20 has been filled with a suitable solvent for the particular plastic used. The solvent preferred is a mixture of 98 per cent trichlorethylene and two per cent glycol diacetate, and is used at room temperature. The "bite" or power to dissolve the plastic flash is a function of the time of travel through the tank, the proportionate amount of glycol diacetate in the solvent solution, and the temperature thereof, all of which may be varied to obtain the desired result of removing the flash and highly polishing the workpiece.

The conveyor chain 46 is started upon its travel throughout its course by energizing the driving motor 58 so that the time of travel through the solvent bath L takes from 1 to 5 minutes. The operator loads the workpieces W onto the lower ends of the shafts 90 after having removed the angle stops 98. He then replaces the angle stops 98 in the shaft grooves 102. The workpieces W, thus mounted (FIG. 1) are conveyed downward upon the carriers 14 into the tank 20 where the pulleys 88 are rolled along the drive track 120 (FIG. 4) by the conveyor 12 to impart rotation to each shaft 90 and workpiece W. The level of the solvent L is so adjusted that only a portion of the workpiece W enters it. As the workpieces W are rotated while travelling lengthwise through the tank 20, their rotation automatically stirs the solvent L without the need for additional agitators or impellers. This rotation subjects the plastic workpiece W to the action of the solvent bath L, removing the molding flash and rearranging the surface molecules so that the surface acquires a high polish. In processing some types of steering wheels, it has been found beneficial to heat the solution in the tank 20 in order to speed up the reaction.

When each work carrier 14 arrives at the end of the tank 20, it is preferably continued to be rotated by an additional length of drive track 120 as it is carried through the oven 24. There the currents of heated air from the heater 30 quickly evaporate any remaining solvent which has not already been removed from the workpiece W by the combined action of surface tension and gravity.

When each work carrier 14 arrives at the end of the oven 24, it emerges therefrom and turns the third corner 26 of the triangular conveyor course, arriving at the unloading station 28. At the unloading station, the operator removes the completed steering wheel or other workpiece W, completing the cycle of operation.

The oven interior is preferably heated to a temperature higher than the boiling point of the solvent bath but lower than the softening point of the plastic of the workpiece W, for example approximately 190° F. The continued rotation of the workpieces W while travelling through the oven 24 prevents the formation of drip marks or protuberances known as "tears."

The speed at which the endless conveyor 12 moves is controllable by adjustment of the variable speed reduction gear box 66, which is a variable speed transmission. This speed in turn controls the number of revolutions per minute which is imparted to each workpiece W, the desired number of such revolutions per minute depending upon the design of the particular steering wheel or other workpiece W. A high degree of purity of the solvent solution must be maintained. This can be controlled by filtration and distillation of the solvent.

The appearance of the workpiece W after the foregoing treatment depends upon the chemical composition of the plastic material or materials, if a mixture of compatible plastics is employed. For example, a workpiece containing a relatively low proportion of filler can be given a high gloss or lustre whereas a workpiece in which the plastic material has a relatively high proportion of filler can be given a low gloss or so-called satin finish. On the other hand, a workpiece containing a mixture of compatible plastics can be given a so-called crinkle finish thereby. Pure acetone or pure glycol diacetate by themselves dissolve too much of the plastic material too rapidly. A solvent solution L may employ acetone, but may also employ a dilutant such as a major proportion of alcohol mixed with a minor proportion of acetone. The use of the heated oven 24 speeds up the drying of the solvent solution and expels it more rapidly from the workpiece than if heating were not employed at this stage of the operation. Such heating, by quickly eliminating the solvent solution, rapidly terminates the effect thereof upon the plastic material and also avoids blemishes on the workpieces W.

It will be observed, however, that the speed of rotation of the workpiece W after leaving the solvent solution L in the tank 20 is not rapid enough to be relied on for expelling the excess solvent by centrifugal force.

We claim:

1. Apparatus for simultaneous deflashing and surface finishing of the annular soluble synthetic plastic peripheries of workpieces, said apparatus comprising an elongated horizontal tank adapted to contain a plastic solvent, a supporting structure disposed adjacent said tank and extending upward relatively thereto, an endless conveyor mounted on said supporting structure in an endless path of travel disposed in an inclined plane extending downward to said tank with a downwardly inclined downwardly moving portion of said conveyor extending downward to said tank, a horizontally disposed horizontally moving lower portion of said conveyor extending alongside said tank in parallel relationship thereto, and an upwardly inclined upwardly moving portion of said conveyor extending upward from said tank, a plurality of workpiece carriers including bracket structures substantially rigidly mounted on said conveyor at intervals therealong for travel therewith and also including downwardly inclined rotatable workpiece-holding shafts rotatably mounted on said bracket structures and projecting downward and outward away from said conveyor at substantially constant angles relatively thereto throughout the endless path of travel thereof, said workpiece-holding shafts projecting toward said tank in such a manner as to immerse in the solvent in said tank solely the synthetic plastic peripheral portions of the workpieces rotatably mounted on said shafts, power-driven means for moving said conveyor and the workpiece carriers linearly relatively to said tank while solely the peripheral portions of the workpieces are immersed in the solvent solution in said tank, and means for rotating said shafts while moving said conveyor in its horizontal path of travel in said inclined plane and simultaneously rotating the workpieces in said tank and agitating the plastic solvent therein while moving the workpieces linearly along said tank.

2. Simultaneous deflashing and surface finishing apparatus, according to claim 1, wherein a drying oven is provided beyond said tank in the upwardly inclined upwardly moving portion of the endless path of travel of said conveyor for heatedly drying the workpieces to expel the solvent therefrom after their emergence from said tank and wherein means is provided in association with said heating means for rotating the workpieces during the heated drying thereof.

3. Simultaneous deflashing and surface finishing apparatus, according to claim 1, wherein a workpiece holder having a quick releasable workpiece gripper is mounted on the end of each shaft and has a workpiece abutment and a workpiece clamping member releasably holding the central portion of the workpiece against said abutment.

* * * * *